Figure 4:
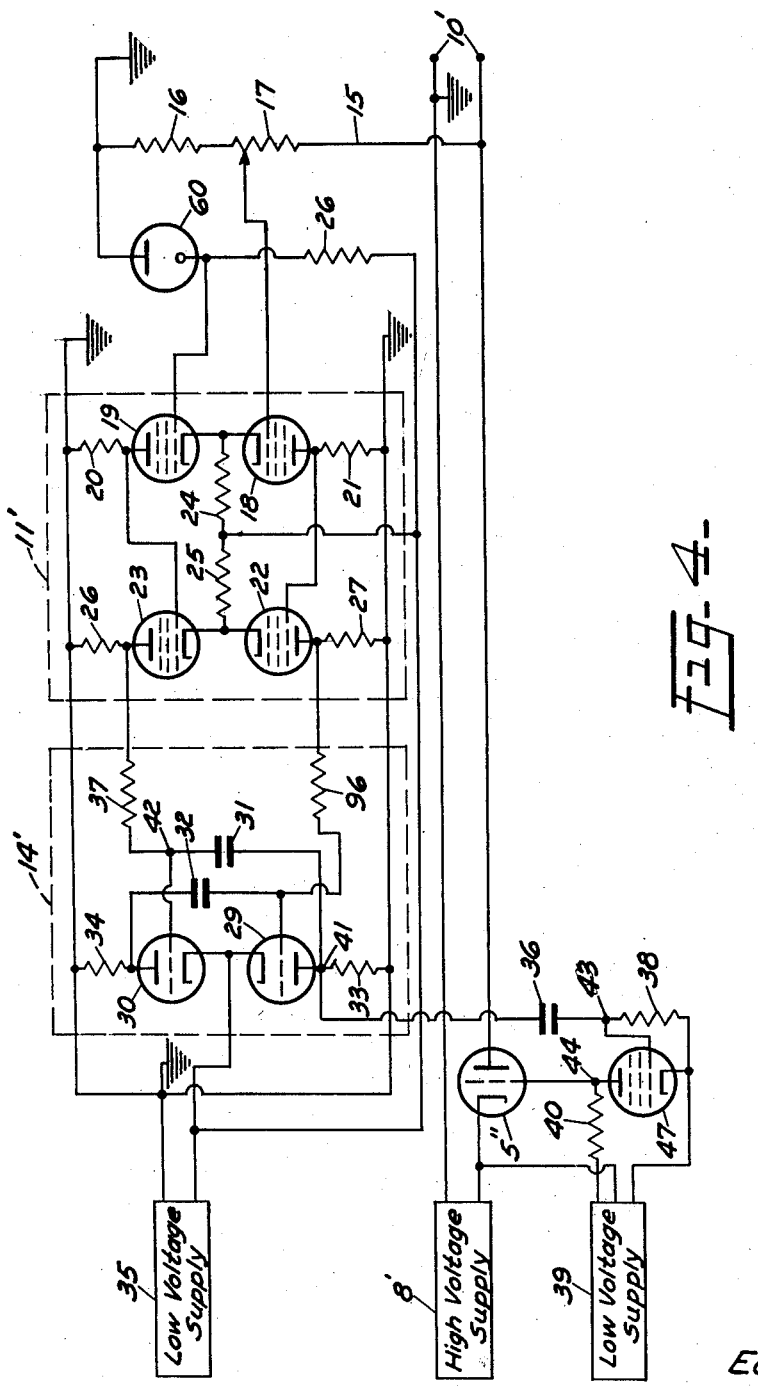

June 23, 1953  E. FAIRSTEIN  2,643,360
VOLTAGE SUPPLY REGULATOR
Filed May 31, 1951  3 Sheets-Sheet 1
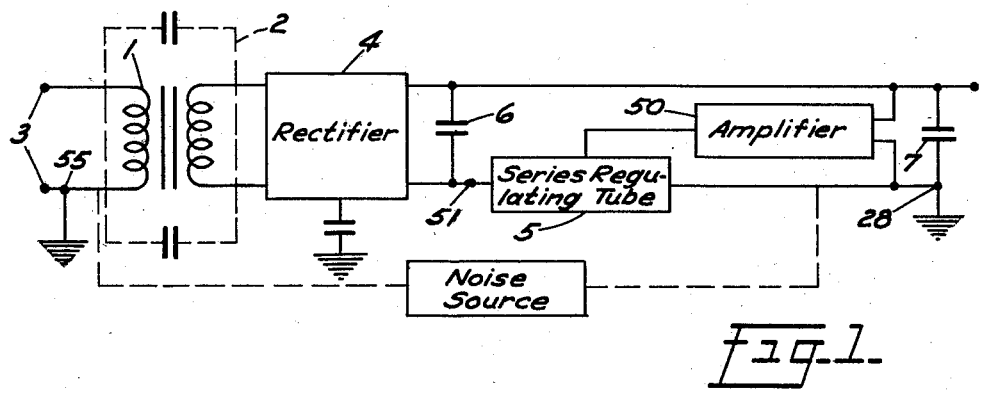
Fig. 1.
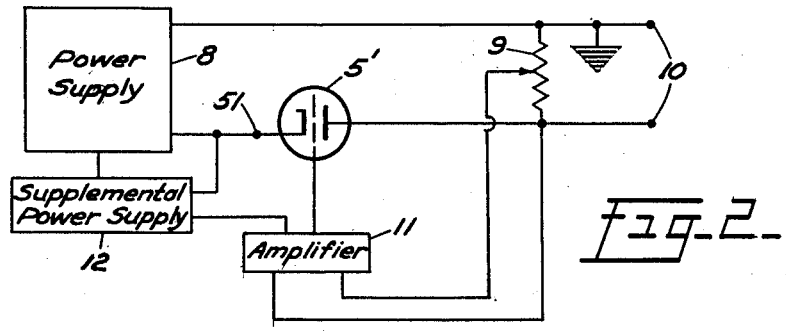
Fig. 2.
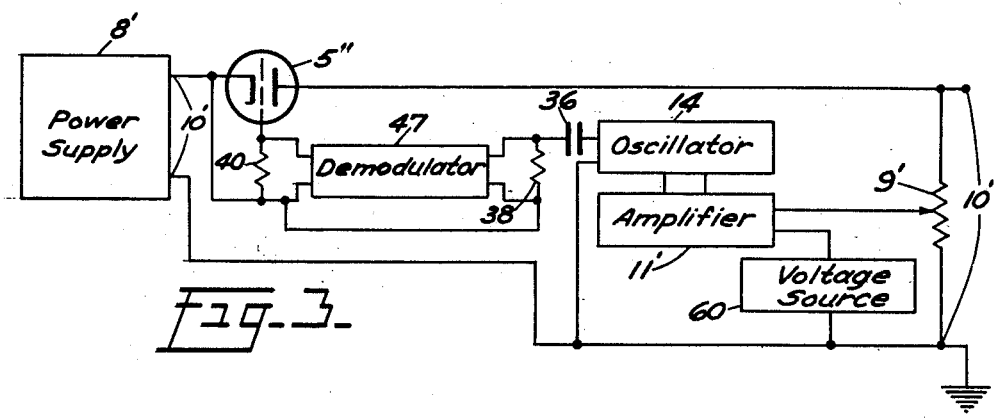
Fig. 3.
⊓_⊓_⊓_ High Voltage Output
⊓_⊓_⊓_ Intermediate Voltage Output
⊓_⊓_⊓_ Low Voltage Output
MULTIVIBRATOR WAVE FORMS
Fig. 5.
INVENTOR
Edward Fairstein
BY
Roland A. Anderson
ATTORNEY June 23, 1953     E. FAIRSTEIN     2,643,360
VOLTAGE SUPPLY REGULATOR Filed May 31, 1951     3 Sheets-Sheet 2

INVENTOR
Edward Fairstein
BY
ATTORNEY

June 23, 1953      E. FAIRSTEIN      2,643,360
VOLTAGE SUPPLY REGULATOR
Filed May 31, 1951      3 Sheets-Sheet 3
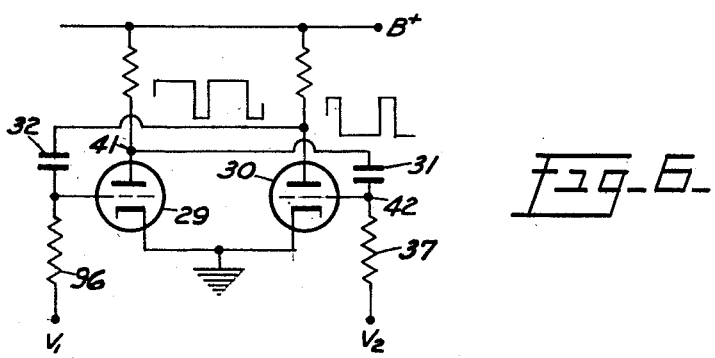
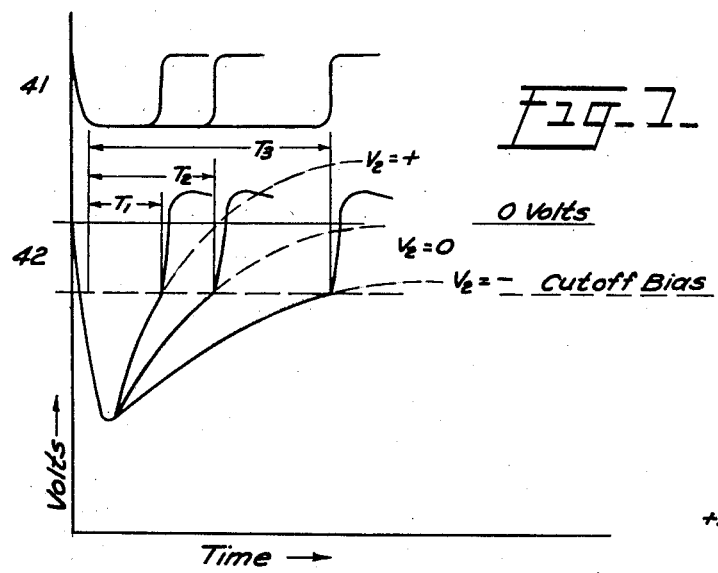
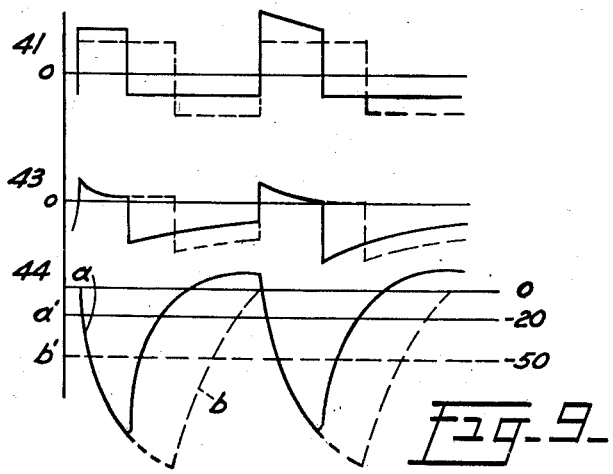
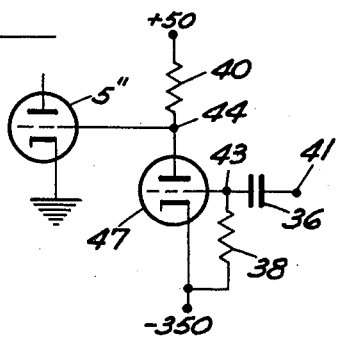
INVENTOR
Edward Fairstein
BY
Roland A. Anderson
ATTORNEY Patented June 23, 1953

2,643,360

UNITED STATES PATENT OFFICE 2,643,360

VOLTAGE SUPPLY REGULATOR

Edward Fairstein, Oak Ridge, Tenn., assignor to the United States of America as represented by the United States Atomic Energy Commission Application May 31, 1951, Serial No. 229,221

9 Claims. (Cl. 323—22)

My invention relates to voltage supply regulators and more particularly to an improved high voltage D. C. power supply regulator which is especially useful in the regulation of high current negative voltage supplies.

The development of nuclear research instruments, especially those associated with high energy particles, has increased the need for high voltage power supplies and regulators for those supplies. A feed-back series type regulator has been used extensively in the past for regulating positive power supplies but the conventional method of reversing the output connections has not been found satisfactory for negative power supplies since the internal capacity of the power transformer of the supply source is effectively in shunt with the usual series regulating tube. Noise and unwanted signals cannot, therefore, be regulated against since they are bypassed around the regulator. In this field low frequency disturbances are the most difficult to get rid of as high frequency or transients can generally be disposed of later on in the circuit by appropriate capacitors.

In the systems of the prior art the series regulating tube to which the feed-back is customarily applied is placed in the positive lead of the power supply, since the negative potential on the grid of the regulating tube must be greater than the negative potential of the line. If placed in the negative lead, it is necessary to employ an additional or supplemental power supply whose output voltage is at least as great as that of the main supply, as the proper negative potential for the grid of the series regulating tube cannot be attained by D. C. coupling of such tube or its amplifier to the power supply. The lower the output voltage the more difficult the problem becomes. Attempts have been made to overcome these problems by employing an A. C. amplifier instead of the D. C. amplifier, and employing a low voltage power source in connection with the arrangement. This permits the insertion of the regulating tube in the negative lead.

Applicant with a knowledge of these problems in the prior art has for an object of his invention the provision of a voltage regulator which may be inserted in either the positive or the negative lead of a D. C. supply line and produce effective regulation.

Applicant has as another object of his invention the provision of a high voltage D. C. regulator wherein the stability is increased and the regulating amplifier and voltage control arm are at ground potential.

Applicant has as another object of his invention the provision of a high voltage D. C. regulator wherein the regulated supply can be varied from voltages as low as the reference voltage to a maximum for which the supply is or may be designed by the control of a single parameter without the inclusion or addition of unwanted noise such as is normally encountered.

Applicant has as a further object of his invention the provision of a system for regulating a high voltage D. C. supply by employing pulse width modulation to couple the regulating tube to the error signal thereby overcoming the effects of noise and other disturbances which might otherwise be coupled into the regulating tube.

Applicant has as a still further object of his invention the provision of a regulator for a high voltage D. C. supply which eliminates the effects of different tube characteristics or changes in characteristics, by employing pulse width modulation between the source of error signal and the regulating tube.

Applicant has as a still further object of his invention the provision of a regulator for a high voltage D. C. source which obviates the problem of synchronization between oscillator and modulator which would be inherent in amplitude modulation coupling of the regulating tube and source of error signal.

Other objects and advantages of my invention will appear from the following specification and accompanying drawings and the novel features thereof will be particularly pointed out in the annexed claims.

In the drawings, Fig. 1 is a schematic of a form of conventional regulator circuit indicating the path of noise currents. Fig. 2 is a schematic of a form of conventional regulator illustrating the insertion of a regulating tube in the negative lead. Fig. 3 is a block diagram of my improved pulse width modulator for a high voltage power supply. Fig. 4 is a schematic of the circuit of my improved high voltage D. C. regulator showing the manner of coupling the regulator tube to the source of error signal. Fig. 5 is a chart showing a series of wave shapes of pulse width modulated signals corresponding to progressively larger error signals. Fig. 6 is a schematic of the circuit of a multivibrator which may be used in my improved circuit. Fig. 7 is a chart or graph of wave shapes corresponding to different voltages impressed upon the grids of the multivibrator. Fig. 8 is an equivalent circuit for the regulating tube and demodulator. Fig. 9 are characteristic wave shapes produced at different points in the circuit of Fig. 8.

Referring to the drawings in detail, 1 designates a conventional power transformer with the distributed capacity shown dotted in at 2 in Fig. 1. The primary of transformer 1 is connected to the power mains 3 where one side is grounded. The secondary of the transformer feeds rectifier 4 and this in turn feeds on through series regulating tube 5 to the load. Condensers indicated at 6, 7 are a part of the customary filter and/or load. One side of the output circuit is grounded beyond the regulating tube 5. A large fraction of the noise voltage which is coupled into point 51 by virtue of the capacity coupling from the ungrounded side of the line, or by virtue of a potential difference appearing between the power supply output ground at 28 and the power line ground at point 55 will be coupled to the input of amplifier 50 through condenser 6.

This conventional circuit cannot regulate away the noise because much of it is of sufficient amplitude to saturate the regulator amplifier.

If the series regulator could be placed in the ungrounded lead of the power supply, however, the noise voltage would appear at the input to the series regulator which is designed to control large amplitude signals. The noise could therefore be regulated out.

In the arrangement of Fig. 2 a circuit is illustrated where the series regulating tube 5' is indicated as being incorporated in the negative power lead from the conventional power supply 8 to the load. A voltage divider or potentiometer 9 is bridged across the output leads 10 beyond the series regulating tube 5' to pick off the error signal and feed it back to the D. C. amplifier 11 which is coupled to the input circuit of the regulating tube 5'. However, the negative potential on the grid of the series regulating tube 5' must be more negative than the negative potential of the line at point 51. Since ordinarily, the output potential of the D. C. amplifier 11 would be more positive than its input, a supplemental power supply 12 of high negative potential must be provided to buck out the positive output potential of amplifier 11. The lower the output voltage, the greater the problem, but such problem might be partially overcome by substituting a special type of A. C. amplifier for the D. C. amplifier and using a low voltage power source for this amplifier.

Now referring to the block diagram of Fig. 3, which represents a preferred embodiment of my invention, 8' designates a conventional power supply which feeds into leads 10'. Positioned in the negative lead is a series regulating tube 5" and bridged across the line beyond the tube is a voltage divider or potentiometer 9' which has a moving contact for picking off the error signal and feeding it into a D. C. amplifier 11'. The error signal is the difference in potential between the voltage from the moving contact and that from the reference voltage source 60, connected in the input circuit of amplifier 11'. The output of the amplifier 11' then feeds into a pulse width modulated carrier oscillator 14 which is to provide the A. C. signal for transferring the error signal through the demodulator 47 to the series regulating tube 5". This results in the use of a minimum of tubes for although a sine wave frequency could be used, such frequency, to be effective, should be at least 100 times that of the line frequency to properly regulate and remove the hum. That arrangement would require tuned circuits and this would necessitate adjustment to maintain phase relationships. It would also require a separate oscillator to supply carrier frequency and this would result in additional tubes. In addition, such a system would employ more stages in the feed-back loop to accomplish regulation. This would increase the difficulty of maintaining stability in the feed-back loop. A substantially constant amplitude carrier would also be required, and this would be effected by differences in tube characteristics. However, by employing pulse width modulation, where the tubes may be driven into the region of saturation, tube characteristics do not effect the operation of the system, and since the same tubes serve the functions of both carrier oscillator and modulator, the synchronization between the two becomes automatic.

The circuit of Fig. 4 represents suitable circuits which may be employed in the embodiment of applicant's invention disclosed in Fig. 3, wherein 8' indicates a source of high voltage supply which feeds the line 10' having its positive side grounded. Interposed in the negative lead is the series regulating tube 5" and bridged across the line beyond the series regulating tube is the input circuit 15 to the feed-back loop. This circuit has a voltage dividing network including resistor 16 and potentiometer 17 whose moving contact is connected in the control grid of pentode 18. The control grid of pentode 19 is connected to the voltage reference source 60. Tubes 18 and 19 constitute a cathode coupled difference amplifier which amplifies the error signal. Resistor 24 is the common cathode resistor. The output signal is the difference between the two voltages developed across the load resistors 20 and 21 connecting the anodes of the two tubes to ground. This output signal is directly coupled to the input of a second similar difference amplifier whose tubes are 22 and 23, whose common cathode resistor is 25, and whose load resistors are 26 and 27. These load resistors as in the previous stage of this amplifier serve to connect the anodes of tubes 22, 23 to ground. The control grid of tube 19 is biased by VR tube 60 which is bridged through resistor 26 across the low voltage supply 35. The control grid of tube 19 being connected at the juncture of the resistor 26 and VR tube 60 is biased to a potential of about −200 volts. The common connection between the two cathode resistors 24, 25 is joined to the negative side of the low voltage supply 35. The carrier oscillator generally designated 14 is a multivibrator consisting of tubes 29, 30, and this multivibrator preferably operates at a frequency of about 250 kilocycles. The plate of tube 29 is coupled to the grid of tube 30 and the grid of tube 29 to the plate of tube 30 by the usual coupling condensers 31, 32, respectively. Load resistors 33, 34 serve to couple the anodes of tubes 29, 30 to ground. The low voltage supply 35 serves not only to supply voltage to the cathode-anode circuit of the tubes of the multivibrator but also to supply the tubes of the D. C. amplifier. It will be noted that the grid resistors 96, 37 of tubes 29, 30, respectively, instead of being returned to a fixed voltage are coupled to the output of the error signal amplifier, that is, to the plates of tubes 22, 23. As indicated more in detail hereinafter, this results in a change in ratio of positive to negative pulse width proportional to the magnitude of the amplitude error signal from the output of tubes 22, 23. Fig. 5 shows the output wave forms of the multivibrator when connected in this manner for different input voltages.

The plate of tube 29 is capacitatively coupled through the condenser 36 to the control grid of the demodulator 47 which in turn has its output directly coupled to the control grid of series regulating tube 5''. The control grid of tube 47 is coupled to the cathode by a resistor 38, and low voltage supply 39 is coupled to the anode-cathode circuit of the demodulator through a load resistor 40. If desired, this low voltage source of supply may be derived from a tap on the high voltage power supply instead of employing a separate low voltage supply.

The demodulator 47 is similar to that of a plate detector. The input signal, however, is great enough to saturate it in both directions. This results in the magnitude of the D. C. output component being sensitive to the ratio of positive to negative pulse width, but not to the amplitude of the input from the multivibrator. However, if amplitude modulation were used, hum voltage in the high voltage power supply would be coupled to and appear on the grid of the series regulating tube 5''. The amplitude of the ripple might be so great that the regulating tube could not compensate for it. Thus an advantage of converting error signal to pulse width modulated signal is that the system will be substantially insensitive to changes in amplitude.

Referring now to the circuit of Fig. 6, which is the multivibrator separated from the rest of the system, the tubes are designated 29, 30, the coupling condensers are designated 31, 32 and the grid resistors are designated 96, 37. The charts are intended to generally show the wave shapes at points 41, 42 since these are important points in the system of Fig. 4. In this connection, it may be noted that the signal for the control grid of the demodulator 47 of Fig. 4 is taken off at point 41 of the multivibrator in order to give negative feed-back, otherwise the circuit would oscillate continuously. Then in order to vary the ratio of on to off time in the half of the multivibrator in Fig. 6 which includes tube 29 the voltage applied to the grid resistors 96, 37 is varied in opposite directions. In applicant's system this is accomplished, as indicated above, by connecting these points to the output of the D. C. amplifier. The wave shapes of the resulting pulses are indicated in Fig. 6 and the chart of Fig. 7 shows the effect on the width of different output pulses by applying different potentials $V_2$ to the grid resistor 37. For a more detailed explanation of the effect on the wave shape where a variable voltage is applied to the grid resistors of a multivibrator, see Electronics, October, 1949, page 144.

In the equivalent circuit of Fig. 8, showing the power supply regulator, condenser 36 may be made as small as 50 mmf. and the grid resistor may have a resistance of 270,000 ohms. The multivibrator frequency feeding in at 41 is preferably around 250 kc. and with these circuit parameters, conditions are such that 60 cycle power supply ripple will not adversely affect the operation of the demodulator 47 and the series tube 5''. The resulting wave form at 44 is important when a rectangular wave is fed in at 41. The size of the resistor 40 is so great that the plate 44 of tube 47 cannot respond to the steep sides of the rectangular waves applied to the grid at 43 so the resulting wave at point 44 becomes curved. The effective potential of the grid of series tube 5'' is the average of the respective curves $a$, $b$ as indicated by the straight lines $a'$, $b'$. If the pulse width is altered so that the portion of the wave below the reference line is different from that above it, the duty cycle will be altered and the average of the voltage output of the demodulator 48 will vary accordingly. This will alter the grid potential of the series tube 5'' and will change its impedance in such a manner as to regulate its conduction. Thus it is seen that with this arrangement regulation will be responsive to changes in error signal, and noise or other disturbances can be excluded.

Having thus described my invention, I claim:

1. A system for regulating a D. C. voltage supply comprising a source of D. C. potential, a supply line fed by the source, a series voltage regulating tube interposed in one lead of said line, a voltage divider network coupled across the line beyond the regulating tube, a reference voltage source, and a circuit coupled to the network through said reference voltage source for feeding back the error signal therefrom to the regulating tube, said circuit including a converter for converting changes in amplitude into pulses of corresponding width, and a device for transmitting a corrective signal to the regulating tube corresponding to changes in pulse width.

2. A system for regulating a D. C. voltage supply comprising a source of D. C. potential, a supply line fed by the source, a series regulating tube interposed in one conductor of the supply line, a voltage divider connected across the line beyond the regulating tube, and a circuit for coupling the error signal appearing across the voltage divider back to the regulating tube, said circuit including a pulse modulator for altering the ratio of pulse width in accordance with changes in the error signal, and a demodulator fed by said modulator for converting changes in pulse width to amplitude changes for application to said regulating tube.

3. A system for regulating a D. C. voltage supply comprising a source of D. C. potential, a supply line fed by the source, a regulating tube coupled to the supply line, a voltage divider coupled across the line beyond the regulating tube, and a feed back circuit coupled to the voltage divider for picking off an error signal therefrom and applying it to the regulating tube, said circuit including a pulse modulator for changing the ratio of pulse widths of positive and negative pulses in accordance with said error signal and a demodulator fed by the pulse modulator for converting the pulses from said modulator into signals of amplitude corresponding to the ratio of positive to negative pulse width for application to the regulating tube.

4. A system for regulating a D. C. voltage supply comprising a source of D. C. potential, a supply line fed by the source, a series regulating tube interposed in one conductor of the line, a voltage divider bridged across the line beyond the regulating tube, a reference voltage source, and a feed back circuit coupled to the voltage divider through said reference voltage source for picking off the error signal therefrom and transmitting it to the regulating tube, said circuit including a pulse width modulator fed by the divider for converting voltage changes into pulse width changes, and a demodulator fed by the modulator for converting pulse width changes into corresponding voltage signals for application to the regulating tube.

5. A system for regulating a D. C. voltage supply comprising a source of D. C. potential, a supply line for the source, a regulator for the supply line, a voltage divider coupled across the supply line, a reference voltage source, and a circuit coupling the voltage divider to the regulator through said reference voltage source, said circuit including a pulse width modulator for converting changes in error signal at the voltage divider into pulse width modulations where the ratio of positive to negative pulse widths are changed in accordance with the error signal, and a demodulator fed by the modulator for converting pulse width modulations into signals of corresponding magnitude for application to the regulator.

6. A system for regulating a D. C. voltage supply comprising a source of D. C. potential, a line fed by said source, a regulator in said line, a voltage divider coupled across the line, and a circuit connecting the regulator with the voltage divider to pick off the error signal appearing there across, said circuit including an amplifier, a pulse width modulator and a demodulator, said modulator taking signals from said amplifier and converting them into pulse width modulations whose ratio of positive pulse width to negative pulse width is dependent upon the error signal, and said demodulator accepting the pulse modulations from the modulator and converting them into voltage signals corresponding to the ratio of positive to negative pulse widths for application to the regulator.

7. A system for regulating a D. C. voltage supply comprising a source of D. C. potential, a supply line fed by said source, a regulator coupled to the supply line, a voltage divider coupled across the line, a source of reference voltage, and a circuit connecting the regulator with the voltage divider through said reference voltage source, said circuit including a difference amplifier coupled to the voltage divider, a pulse width modulator fed by the amplifier for converting error signal into positive and negative pulses the ratio of the widths of which is dependent upon changes in the error signal, and a demodulator coupled to the modulator for converting the signals from the modulator into amplitude changes for application to the regulator.

8. A system for regulating a D. C. voltage supply comprising a source of D. C. potential, a supply line fed by the source, a series regulating tube coupled into a conductor of the line, a voltage divider bridged across the line beyond the regulating tube, and a circuit for coupling an error signal from the voltage divider to the regulating tube, said circuit including a D. C. amplifier fed by the voltage divider, a pulse width modulator fed by the amplifier for converting changes in error signal to pulse width modulations, and a demodulator fed by the modulator and responsive to the pulse width modulations for producing signals of magnitude corresponding to the ratio of positive to negative pulse width for application to the regulating tube.

9. A system for regulating a D. C. voltage supply comprising a source of D. C. potential, a supply line fed by the source, a series regulating tube in a conductor of the supply line, a voltage dividing network bridged across the line, a source of reference voltage, and a circuit for coupling the regulating tube to the network through said source, said circuit including a difference amplifier fed by the error signal from the voltage divider, a multivibrator having the control grids of its tubes coupled to the amplifier for converting error signal into pulse width modulations, and a demodulator fed by the multivibrator for converting pulse width modulations into signals whose magnitudes correspond to said modulations for application to the regulating tube.

EDWARD FAIRSTEIN.

References Cited in the file of this patent

UNITED STATES PATENTS

| Number | Name | Date |
|---|---|---|
| 2,210,393 | Braden | Aug. 6, 1940 |
| 2,318,644 | Tubbs | May 11, 1943 |